US007817876B2

(12) United States Patent
Huang

(10) Patent No.: US 7,817,876 B2
(45) Date of Patent: Oct. 19, 2010

(54) METHOD OF NOISY SIGNAL ANALYSIS AND APPARATUS THEREOF

(75) Inventor: Ming-Sung Huang, HsinChu (TW)

(73) Assignee: Etron Technology, Inc., Hsinchu (TW)

( * ) Notice: Subject to any disclaimer, the term of this patent is extended or adjusted under 35 U.S.C. 154(b) by 1107 days.

(21) Appl. No.: 11/401,901

(22) Filed: Apr. 12, 2006

(65) Prior Publication Data

US 2007/0252792 A1 Nov. 1, 2007

(51) Int. Cl.

*G06K 9/40* (2006.01)
*G06K 9/38* (2006.01)
*G06K 9/00* (2006.01)
*G09G 3/34* (2006.01)
*H04N 1/40* (2006.01)

(52) U.S. Cl. ........................ 382/275; 345/84; 382/270; 382/251; 358/466

(58) Field of Classification Search ...................... None
See application file for complete search history.

(56) References Cited

U.S. PATENT DOCUMENTS 4,413,279 A * 11/1983 Gorl ........................... 348/89
4,974,214 A * 11/1990 Forster et al. ................ 367/98
5,032,866 A * 7/1991 Shoden et al. ................ 355/38
5,481,376 A * 1/1996 Kawashima ................ 382/274
5,542,395 A * 8/1996 Tuckey et al. ............... 123/497
5,615,279 A * 3/1997 Yoshioka et al. ............ 382/131
5,689,623 A * 11/1997 Pinard ........................ 358/1.6
5,754,709 A * 5/1998 Moriya et al. ............... 382/274
6,016,154 A * 1/2000 Moroo et al. ............... 345/442
6,216,109 B1 * 4/2001 Zweben et al. ................. 705/8
6,411,238 B1 * 6/2002 Koyanagi et al. ........... 341/144
6,452,631 B1 * 9/2002 Hsu et al. ................... 348/254
6,597,923 B1 * 7/2003 Vanghi et al. ............... 455/522
7,272,265 B2 * 9/2007 Kouri et al. ................. 382/260
2002/0109668 A1 * 8/2002 Rosenberg et al. .......... 345/156
2003/0128299 A1 * 7/2003 Coleman et al. ............ 348/674
2004/0257324 A1 * 12/2004 Hsu ............................ 345/89
2006/0256226 A1 * 11/2006 Alon et al. .................. 348/335
2007/0025625 A1 * 2/2007 Burian et al. ............... 382/237
2007/0081737 A1 * 4/2007 Lertrattanapanich et al. ..... 382/254
2007/0192033 A1 * 8/2007 Jojic et al. .................... 702/19
2008/0158443 A1 * 7/2008 Shiomi ....................... 348/790

* cited by examiner

*Primary Examiner*—Wes Tucker
*Assistant Examiner*—Michelle Entezari
(74) *Attorney, Agent, or Firm*—Muncy, Geissler, Olds & Lowe, PLLC

(57) ABSTRACT

A noisy signal analysis in which a threshold value is set to evaluate the presentation of the display device. The analysis can produce the range of noise level of the image for measuring the distortion block of image caused by the display devices. Furthermore, the apparatus includes a step function generator for producing step functions, a transforming unit for changing threshold value in step functions, and a display for showing the image corresponding to both the high value and low value.

22 Claims, 5 Drawing Sheets

METHOD OF NOISY SIGNAL ANALYSIS AND APPARATUS THEREOF

BACKGROUND OF THE INVENTION

1. Field of the Invention

The present invention relates to a method and an apparatus of noisy signal analysis, and more especially, to a method and an apparatus of noisy signal analysis applied to the liquid crystal display (LCD).

2. Background of the Related Art

Currently, since the liquid crystal display (LCD) is booming in IT industry, the monitors of PC have shifted from CRT to the LCD, moreover, the price of LCD is declining very quickly than expected. Although the LCD has a big screen advantage in flat shape, some disadvantages still exist, for example, color temperature, visible angle, contrast, response time and so on.

The LCD manufacturing processes include: array, cell, and assembly, all these processes encounter many component and assemblies. At end products, the test and adjustment are needed due to low stability of processes, the test includes gray test, brightness test, then the electrical adjustment for characteristic, sometimes, the screen displays have noisy signal unseen from human eyes, such as flicker.

SUMMARY OF THE RELATED ART

In order to solve the problems mentioned above, the present invention provides a method of noisy signal analysis applied to a liquid crystal display. The method adjusts a threshold in a step function and obtains a noisy signal range, which may provide the information to tune the gray value and brightness for the LCD.

In order to solve the problems mentioned above, the present invention provides an apparatus of noisy signal analysis applied to a liquid crystal display. The apparatus adjusts the gray value and brightness for the LCD to observe the noisy range, and provides test person to measure the LCD quality.

Accordingly, one embodiment of the present invention provides a method of noisy signal analysis, including: setting a predetermined step function, which changes each signal in a signal group to a first identical value; changing a threshold value of the predetermined step function to a first threshold value which induces a first step function, wherein the first step function changes a signal in the signal group from becoming the first identical value to becoming a second identical value; and continuing changing the first threshold value of the first step function to a second threshold value which induces a second step function, wherein the second step function changes all signals in the signal group from becoming the first identical value to becoming the second identical value.

Additionally, another embodiment of the present invention provides a method of noisy signal analysis, including: setting a first step function having a first threshold value, and the first step function changes each signal in a signal group to a first identical value, wherein the first threshold value changes a specified quantity causing the first signal in the signal group from becoming the first identical value to becoming the second identical; and setting a second step function having a second threshold value, and the second step function changes each signal in a signal group to a second identical value, wherein the second threshold value changes the specified quantity causing the second signal in the signal group from becoming the second identical value to becoming the first identical value; wherein the signal group has noisy distribution between the first threshold value and the second threshold value.

Furthermore, another embodiment of the present invention provides an apparatus of noisy signal analysis, including: a step function generator generating a plural step functions, which comprises a first step function having a first threshold value and a second step function having a second threshold value; a transforming unit changing each signal in a signal group to a first identical value according to the first step function and changing every signal of the signal group to the second identical value according to the second step function, wherein the first threshold value changes a specified quantity causing the first signal in the signal group from becoming the first identical value to becoming the second identical, and the second threshold value changes the specified quantity causing the second signal in the signal group from becoming the second identical value to becoming the first identical value; and a display device outputting a range of noisy distribution according to the first threshold value and the second threshold value.

DETAILED DESCRIPTION OF THE INVENTION

A method and an apparatus of noisy signal analysis are disclosed. The invention uses a threshold value in a predetermined step function to test signal appearance in an image displayed on a screen of Flat Panel Display (FPD), whereupon, a noisy distribution will be obtained for noisy signal analysis for that FPD.

Figure 1:
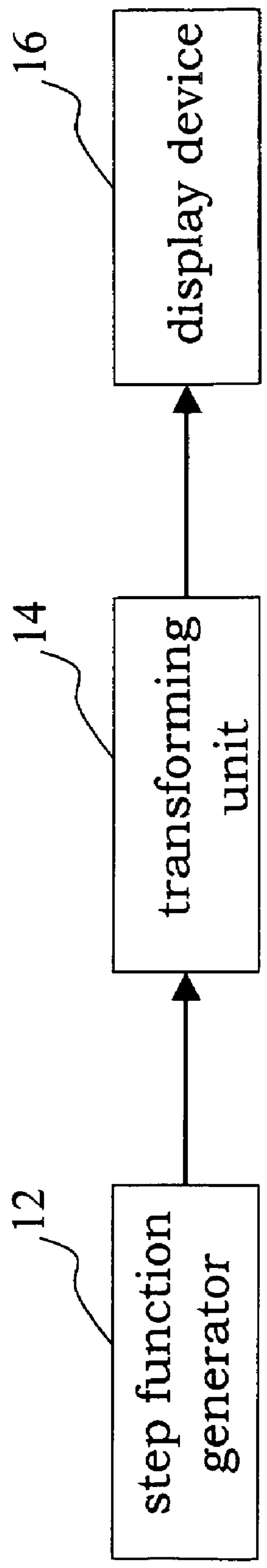
FIG. 1 is a functional diagram of the apparatus of noisy signal analysis in accordance with an embodiment of the present invention.

FIG. 1 is a functional diagram of the apparatus of noisy signal analysis in accordance with an embodiment of the present invention. The apparatus of noisy signal analysis includes: a step function generator 12, a transforming unit 14, and a display device 16. The step function generator 12 is for generating a step function with a threshold, a first step level and a second step level according to a gamma correction function. The threshold is variable, and the first step level and the second step level are respectively set to be a first identity value and a second identity value. The transforming unit 14 transforms each signal in a signal group with the step function received from the step function generator 12 and controls the step function generator 12 to change the threshold of the step function iteratively. until a first threshold value and a second threshold value have been obtained. The first threshold value is characterized such that if changed by a predetermined amount, a first signal in the signal group is caused to be transformed to the second identity value, and the second threshold value is characterized such that if changed by the predetermined amount, a second signal in the signal group is caused to be transformed to the first identity value. The display device 16 outputs the range of the signal group according to the first threshold value and the second threshold value.

According to an embodiment, the first identity value is greater than the second identity value, and the first threshold value is smaller than the second threshold value. The first threshold value is characterized to cause the first signal in the signal group to be transformed to the second identity value if increased by the predetermined amount, and the second threshold value is characterized to cause the second signal in the signal group to be transformed to the first identity value if decreased by the predetermined amount.

According to another embodiment, the first identity value is smaller than the second identity value, and the first threshold value is greater than the second threshold value. The first threshold value is characterized to cause the first signal in the signal group to be transformed to the second identity value if decreased by the predetermined amount, and the second threshold value is characterized to cause the second signal in the signal group to be transformed to the first identity value if increased by the predetermined amount.

Additionally, the display device 16 may be a flat panel display (FPD) or a liquid crystal display (LCD).

Figure 2:
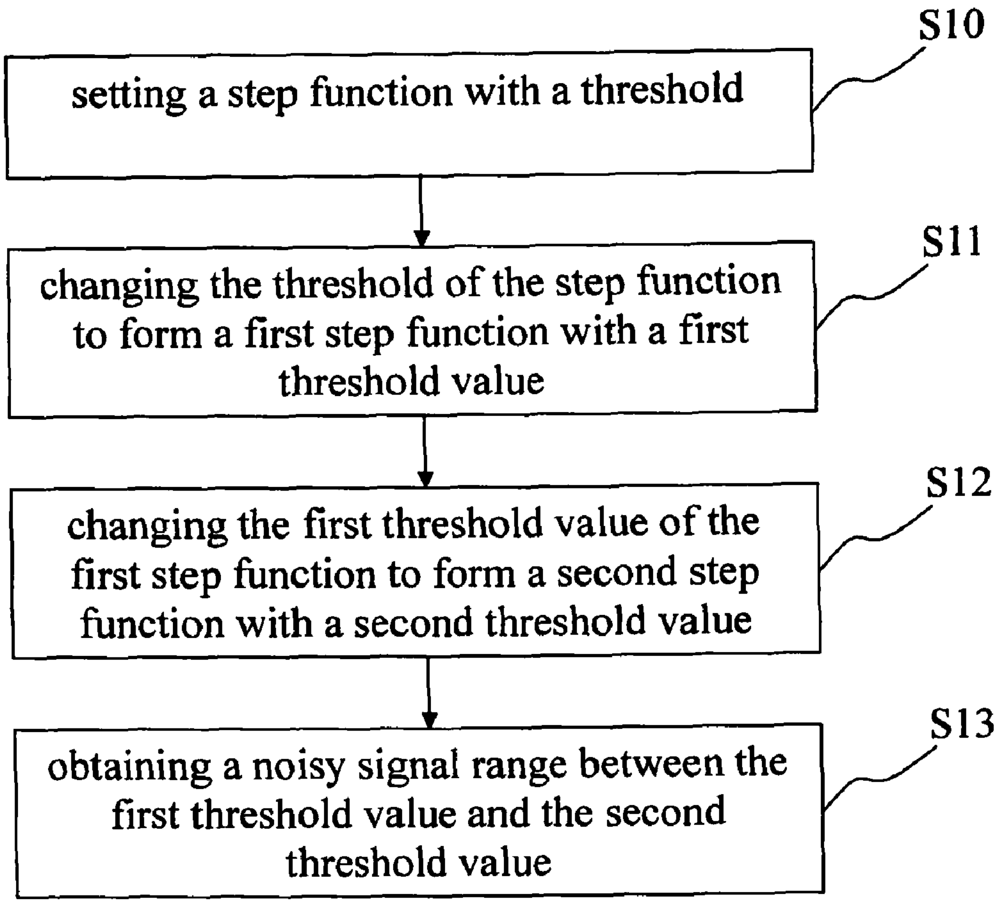
FIG. 2 is a flow chart of the method of noisy signal analysis in accordance with an embodiment of the present invention.

FIG. 2 is a flow chart of the method of noisy signal analysis in accordance with an embodiment of the present invention. The method of noisy signal analysis includes the following steps: setting a step function with a threshold (step S10); changing the threshold of the step function to form a first step function with a first threshold value (step S11); changing the first threshold value of the first step function to form a second step function with a second threshold value (step S12); and obtaining a noisy signal range between the first threshold value and the second threshold value (step S13). In step S10, when setting the step function, two step levels are respectively set to be two identity values, a high value (HVAL) and a low value (LVAL) of gray level on an image signal of the display device, and the threshold is set to he a predetermined threshold value, so that the step function transforms each signal in the group of image signals to HVAL. In step S11, the threshold of the step function is increased starting from the predetermined threshold value and each signal in the signal group with the step function is transformed iteratively, until the threshold reaches the first threshold value so that the step function transforms a signal in the signal group to LVAL. The first threshold value is the lower bound of the image signal. In step S12, the threshold in step Sll is continually increased starting from the first threshold value and each signal in the signal group with the step function is transformed iteratively, until the threshold reaches the second threshold value so that the step function transforms all signals in the signal group to LVAL. The second threshold value is the upper bound of the image block and is greater than the first threshold value. In step S13, a noisy signal range, a range between the upper bound and the lower bound of the group of image signals on display device, is obtained. According to an embodiment, the noisy signal analysis method is carried out by a processor.

Furthermore, changing the threshold value causing the signal in the image signal to be transformed to HVAL using the flowchart of FIG. 2 is another method of noisy signal analysis in accordance with an embodiment of the present invention. The method of noisy signal analysis includes the following steps: setting a threshold of a step function to be a first threshold value (step S10); changing the threshold of the step function to form a first step function with a first threshold value (step S11); changing the first threshold value of the first step function to form a second step function with a second threshold value (step S12); and obtaining a noisy signal range between the first threshold value and the second threshold value (step S13). In step S10, when setting the step function, two step levels are respectively set to be two identity values, a low value (LVAL) and a high value (HVAL) of gray level on a an image signal of the display device, and the threshold is set to be a predetermined threshold value, so that the step function transforms each signal in the group of image signals to LVAL. In step S11, the threshold of the step function is decreased starting from the threshold value and each signal in the signal group with the step function is transformed iteratively, until the threshold reaches the first threshold value so that the step function transforms a signal in the signal group to HVAL. The first threshold value is the upper bound of the image signal. In step S12, the threshold in step S11 is continually decreased starting from the first threshold value and each signal in the signal group with the step function is transformed iteratively, until the threshold reaches the second threshold value so that the step function transforms all signals in the signal group to HVAL. The second threshold value is the lower bound of the image block and is smaller than first threshold value. In step S13, a noisy signal range, a range between the upper bound and the lower bound, is obtained for noisy signal correction of the image on display device. According to an embodiment, the noisy signal analysis method is carried out by a processor.

Additionally, the display device may be a flat panel display (FPD) or a liquid crystal display (LCD).

Figure 3:
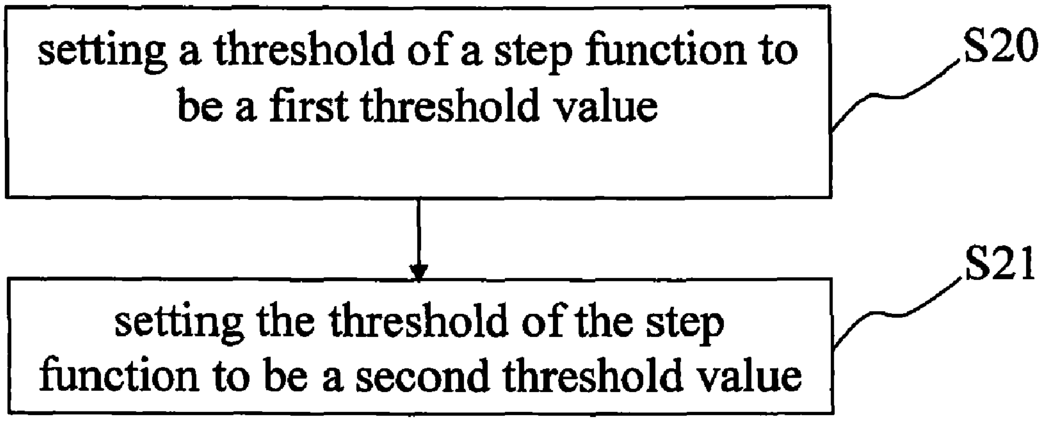
FIG. 3 is another flow chart of the method of noisy signal analysis in accordance with an embodiment of the present invention.

FIG. 3 is a flow chart of the method of noisy signal analysis in accordance with another embodiment of the present invention. The method of noisy signal analysis includes the following steps: a step, S20, of setting a threshold of a function to be a first threshold value, wherein a first step level and a second step level of the step function is preset to be a first identity value and a second identity value, and the first threshold value is set by iteratively changing the threshold of the step function and transforming each signal in a signal group with the step function until the threshold reaches the first threshold value so that the step function transforms each signal in the signal group to the first identity value, and if the first threshold value is changed by a predetermined amount, a first signal in the signal group is caused to be transformed to the second identical; and a step, S21, of setting the threshold of the step function to be a second threshold value, wherein the second threshold value is set by iteratively changing the threshold of the step function and transformings each signal in the signal group with the step function until the threshold reaches the second threshold value so that the step function transforms each signal in the signal group to the second identity value, and if the second threshold value is changed by the predetermined amount, a second signal in the signal group is caused to be transformed to the first identical value; wherein the signal group is bounded between the first threshold value and the second threshold value. According to an embodiment, the noisy signal analysis method is carried out by a processor.

Accordingly, the first identity value is greater than the second identity value, and the first threshold value is smaller than the second threshold value. The first threshold value is characterized to cause the first signal in the signal group to be transformed to the second identity value if increased by the predetermined amount, and the second threshold value is characterized to cause the second signal in the signal group to be transformed to the first identity value if decreased by the predetermined amount. In another embodiment, the first identical value is smaller than the second identical value, and the first threshold value is greater than the second threshold value. The first threshold value is characterized to cause the first signal in the signal group to be transformed to the second identity value if decreased by the predetermined amount, and the second threshold value is characterized to cause the second signal in the signal group to be transformed to the first identity value if increased by the predetermined amount.

Figure 4:
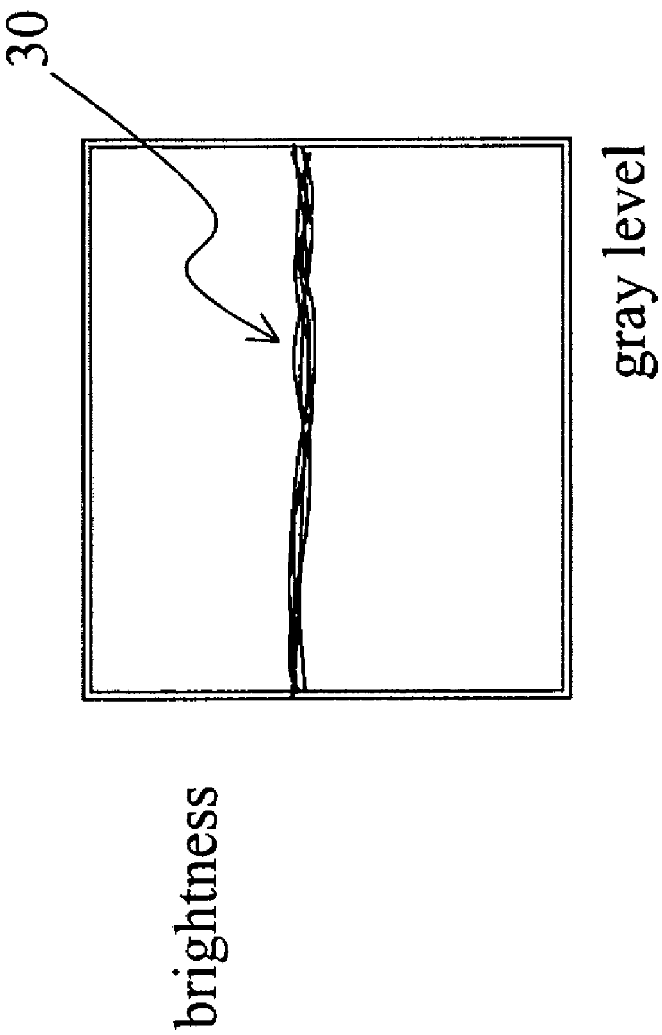
FIG. 4 illustrates the original image curve displayed on the LCD.
Figure 5:
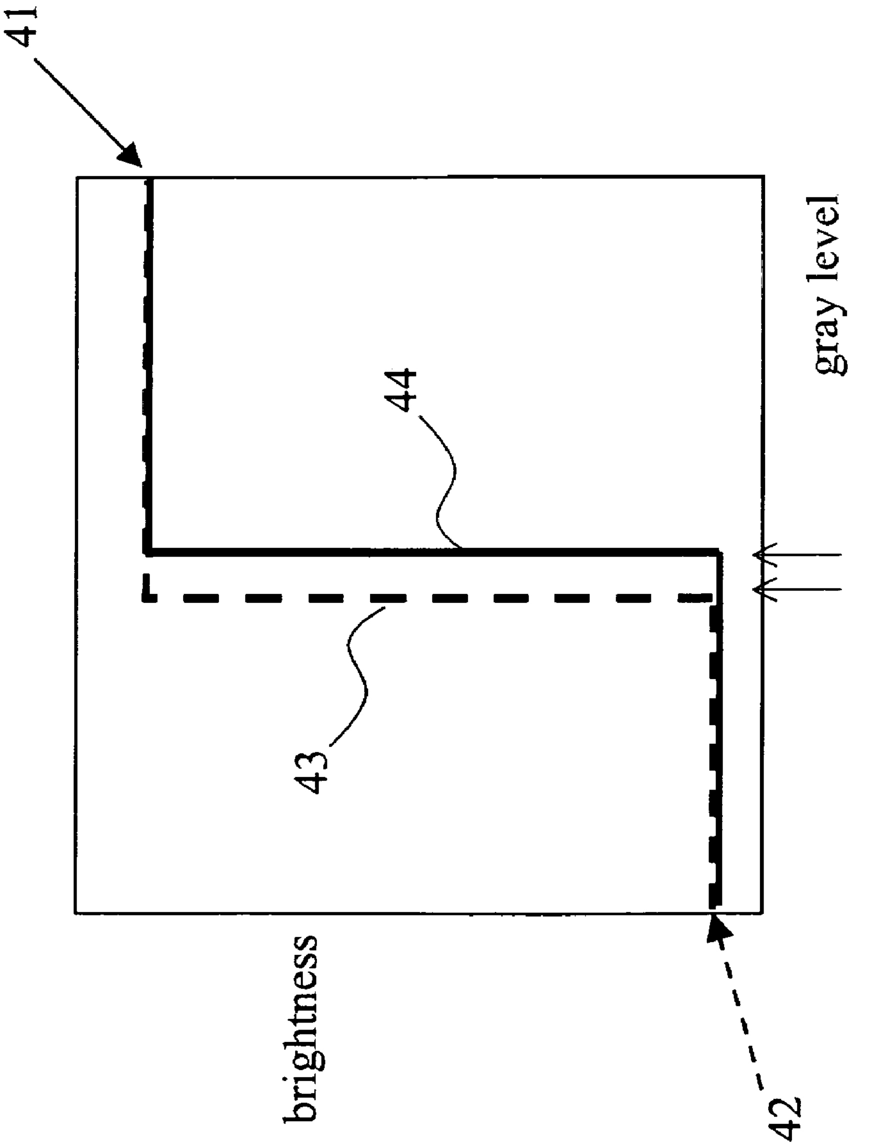
FIG. 5 illustrates the gamma curve of FIG. 4 in accordance with an embodiment of the present invention.

Accordingly, the gamma correction function may be used as the step function in the invention. FIG. 4 illustrates the original image curve 30 displayed on the LCD. In applying the invention, the FIG. 5 illustrates the gamma curve of FIG. 4 in accordance with an embodiment of the present invention. Firstly, setting HVAL 41 and LVAL 42; secondly, setting a threshold value and increasing threshold valve until lower bound (LB) 43 value displayed in the image block; next, continually increasing the threshold value until all image block display upper bound (UB) 44 value; finally, the range between lower bound value and upper bound value is used for gray noisy signal in display device.

Furthermore, the invention is not limited to the gamma correction function, further the Look Up Table (LUT), polynomial function, and piecewise interpolation may be used and make the present invention displays noisy signal effectively for checking the defects of the display device.

Although the present invention has been explained in relation to its preferred embodiment, it is to be understood that other modifications and variation can be made without departing the spirit and scope of the invention as hereafter claimed.

What is claimed is:

1. A method of noisy signal analysis carried out by a processor, comprising:

(a) setting a threshold, a first step level and a second step level of a step function to be a predetermined threshold value, a first identity value and a second identity value respectively, so that said step function transforms each signal in a signal group to said first identity value;

(b) starting from said predetermined threshold value, changing said threshold of said step function and transforming each signal in said signal group with said step function iteratively, until said threshold reaches a first threshold value so that said step function transforms a signal in said signal group to said second identity value; and (c) starting from said first threshold value, changing said threshold of said step function and transforming each signal in said signal group with said step function iteratively, until said threshold reaches a second threshold value so that said step function transforms all signals in said signal group to said second identity value, wherein the range of said signal group is bounded between said first threshold value and said second threshold value.

2. The method of noisy signal analysis carried out by a processor according to claim 1, wherein said first identity value is greater than said second identity value, and said first threshold value is smaller than said second threshold value.

3. The method of noisy signal analysis carried out by a processor according to claim 2, in step (b) the way of changing said threshold is to increase said threshold from said predetermined threshold value to said first threshold value.

4. The method of noisy signal analysis carried out by a processor according to claim 2, in step (c) the way of changing said threshold is to increase said threshold from said first threshold value to said second threshold value.

5. The method of noisy signal analysis carried out by a processor according to claim 1, wherein said first identity value is smaller than said second identity value, and said first threshold value is greater than said second threshold value.

6. The method of noisy signal analysis carried out by a processor according to claim 5, in step (b) the way of changing said threshold is to decrease said threshold from said predetermined threshold value to said first threshold value.

7. The method of noisy signal analysis carried out by a processor according to claim 5, in step (c) the way of changing said threshold is to decrease said threshold from said first threshold value to said second threshold value.

8. The method of noisy signal analysis carried out by a processor according to claim 1, wherein said signal group is composed of the pixels of one image.

9. The method of noisy signal analysis carried out by a processor according to claim 8, wherein said image is outputted from a display device, and each signal from said signal group corresponds to said first identity value or said second identity value after being transformed.

10. The method of noisy signal analysis carried out by a processor according to claim 8, wherein said step function is generated by adjusting a gamma correction function.

11. An apparatus of noisy signal analysis, comprising:

a step function generator for generating a step function with a threshold, a first step level and a second step level, wherein said threshold is variable, and said first step level and said second step level are respectively set to be a first identity value and a second identity value;

a transforming unit transforming each signal in a signal group with said step function received from said step function generator and controlling said step function generator to change said threshold of said step function iteratively, until a first threshold value and a second threshold value have been obtained, wherein said first threshold value is characterized such that if changed by a predetermined amount, a first signal in said signal group is caused to be transformed to said second identity value, and said second threshold value is characterized such that if changed by said predetermined amount, a second signal in said signal group is caused to be transformed to said first identity value; and a display device outputting a range of said signal group according to said first threshold value and said second threshold value.

12. The apparatus of noisy signal analysis according to claim 11, wherein said first identity value is greater than said second identity value, and said first threshold value is smaller than said second threshold value.

13. The apparatus of noisy signal analysis according to claim 12, wherein said first threshold value is characterized to cause said first signal in said signal group to be transformed to said second identity value if increased by said predetermined amount, and said second threshold value is characterized to cause said second signal in said signal group to be transformed to said first identity value if decreased by said predetermined amount.

14. The apparatus of noisy signal analysis according to claim 11, wherein said first identity value is smaller than said second identity value, and said first threshold value is greater than said second threshold value.

15. The apparatus of noisy signal analysis according to claim 14, wherein said first threshold value is characterized to cause said first signal in said signal group to be transformed to said second identity value if decreased by said predetermined amount, and said second threshold value is characterized to cause said second signal in said signal group to be transformed to said first identity value if increased by said predetermined amount.

16. The apparatus of noisy signal analysis according to claim 11, wherein said step function generator generates a plural step functions according to a gamma correction function.

17. A method of noisy signal analysis carried out by a processor, comprising:

(a) setting a threshold of a step function to be a first threshold value, wherein a first step level and a second step level of said step function is preset to be a first identity value and a second identity value, and said first threshold value is set by iteratively changing said threshold of said step function and transforming each signal in a signal group with said step function until said threshold reaches said first threshold value so that said step function transforms each signal in said signal group to said first identity value, and if said first threshold value is changed by a predetermined amount, a first signal in said signal group is caused to be transformed to said second identity value; and (b) setting said threshold of said step function to be a second threshold value, wherein said second threshold value is set by iteratively changing said threshold of said step function and transforming each signal in said signal group with said step function until said threshold reaches said second threshold value so that said step function transforms each signal in said signal group to said second identity value, and if said second threshold value is changed by said predetermined amount, a second signal in said signal group is caused to be transformed to said first identity value, wherein said signal group is bounded between said first threshold value and said second threshold value.

18. The method of noisy signal analysis carried out by a processor according to claim 17, wherein said first identity value is greater than said second identity value, and said first threshold value is smaller than said second threshold value.

19. The method of noisy signal analysis carried out by a processor according to claim 18, wherein said first threshold value is characterized to cause said first signal in said signal group to be transformed to said second identity value if increased by said predetermined amount, and said second threshold value is characterized to cause said second signal in said signal group to be transformed to said first identity value if decreased by said predetermined amount.

20. The method of noisy signal analysis carried out by a processor according to claim 17, wherein said first identity value is smaller than second identity value, and said first threshold value is greater than said second threshold value.

21. The method of noisy signal analysis carried out by a processor according to claim 20, wherein said first threshold value is characterized to cause said first signal in said signal group to be transformed to said second identity value if decreased by said predetermined amount, and said second threshold value is characterized to cause said second signal in said signal group to be transformed to said first identity value if increased by said predetermined amount.

22. The method of noisy signal analysis carried out by a processor according to claim 17, wherein said step function is generated by a gamma correction function.

* * * * *